No. 782,375. PATENTED FEB. 14, 1905.
J. W. AYLSWORTH.
COMPOSITION FOR MAKING DUPLICATE PHONOGRAPH RECORDS.
APPLICATION FILED NOV. 3, 1903.
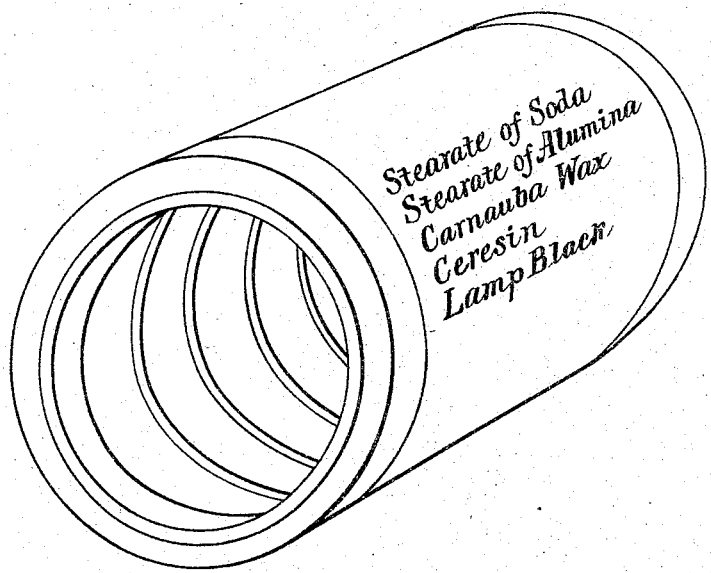
Attest:
Edgeworth Greene
Delos Holden
Inventor:
Jonas W. Aylsworth
by Frank L. Dyer
Atty.

No. 782,375.                                        Patented February 14, 1905.

UNITED STATES PATENT OFFICE.

JONAS W. AYLSWORTH, OF EAST ORANGE, NEW JERSEY, ASSIGNOR TO NEW JERSEY PATENT COMPANY, OF ORANGE, NEW JERSEY, A CORPORATION OF NEW JERSEY.

COMPOSITION FOR MAKING DUPLICATE PHONOGRAPH-RECORDS.

SPECIFICATION forming part of Letters Patent No. 782,375, dated February 14, 1905.

Application filed November 3, 1903. Serial No. 179,729.

*To all whom it may concern:*

Be it known that I, JONAS W. AYLSWORTH, a citizen of the United States, residing at East Orange, in the county of Essex and State of New Jersey, have invented certain Improvements in Compositions for Making Duplicate Phonograph-Records, of which the following is a description.

My invention relates to a new composition adapted particularly for making duplicate phonograph-records obtained by any suitable process from a matrix or mold; but the composition has been gotten up especially for making duplicate phonograph-records obtained by the process described in patent to Miller and Aylsworth, No. 683,615, dated October 1, 1901, and wherein a suitable mold carrying on its bore the negative representation of the record to be duplicated is immersed in a molten wax-like coagulable material, which forms a coagulated layer of the desired thickness on the bore of the mold, after which the material is reamed out internally while warm and the resulting duplicate removed by shrinking diametrically and removing the same longitudinally from the mold, its ends being finally finished. The desirable properties or characteristics of my improved composition are such, however, that it may be effectively utilized for the manufacture of duplicate phonograph-records obtained by means of any process wherein material in a molten or plastic condition is introduced into a matrix or mold and is allowed to set or is expanded therein so as to take an impression, being removed by diametric shrinkage sufficient to clear the engaging surfaces.

A composition suitable for the purpose should have certain peculiarities, which I have been able to secure only after long experiment. In the first place, the composition should be very limpid when in a molten or plastic state, so as to flow into intimate engagement or contact with the record-surface, and thereby permit a very sharp impression to be received. It should be free of decomposition products, which would otherwise result in the generation of gas, forming bubbles, which would destroy the commercial character of the record-surface. It should be of excessively-fine texture or grain, so as not to produce extraneous sounds when the reproducer rubs over it. It should be very hard when set, so as to reduce wear as much as possible, due to the tracking of the reproducer. It should have the capacity of passing from the liquid to the solid state through an intermediate condition of gradually-reduced plasticity, to thereby enable the duplicate to shrink internally and toward the surface, so as not to clear the mold until quite hard, to thereby preserve the record, instead of chilling very rapidly at the surface to form a relatively hard film, which tends to shrink away from the mold even when the mass of the material is still molten, since I find that materials having this latter characteristic are not suitable for the purpose, owing to the danger of the record-surface being injured under the effect of the unequal chilling. It should not be sticky or tenacious, so as to adhere to the mold when set, even to the smallest extent. It should be capable of shrinking away from the mold when quite hard by a reduction in its temperature. It should have a very smooth and polished surface, so as to eliminate foreign noises due to the tracking of the reproducer. It should be free from air and gas bubbles, which if present at the surface would destroy the commercial character of any duplicates containing them. It should shrink uniformly without warping, so as to be capable of effective use with standard talking-machines. It should not be affected by moisture, so as to be preserved in damp climates, and it should have a high melting-point, so as not to soften in hot localities. When hot, it should be capable of being cleanly cut in reaming without dragging or chipping, so as to present a smooth clean surface on the bore of the duplicate. Preferably it should be of a very dark color to permit imperfections to be better observed. It should be perfectly amorphous and non-crystalline, since the latter materials harden very quickly at the surface when their congealing temperature is reached and shrink irregularly, with the objections pointed out. The composition which I have invented and which will be herein described is one possessing these characteristics, and hence is especially adapted for use in this art.

In describing my improved composition and the process which I prefer to follow in compounding the same I shall refer to preferable proportions of ingredients, to preferable steps or procedures in the process, and to preferable temperatures, all based on actual practical experience in this art; but it will be understood that in these respects considerable variations may be made, as will be obvious to those skilled in the art.

Reference is hereby made to the accompanying drawing, which shows in perspective a phonograph-record having inscribed thereon the names of ingredients which are preferably used in the preparation of my invention.

In making my improved composition I prefer to proceed, therefore, substantially as follows:

I first take one hundred pounds of commercial stearic acid, which, as is known, is generally a mixture of stearic and palmitic acids, and melt the same in a suitable galvanized-iron caldron or other vessel at a temperature of about 240° Fahrenheit. The stearic acid used melts at about 136° Fahrenheit. Care should be taken to see that the stearic acid is substantially free from oleic acid, as well as from mineral acids, salts, glycerin, and undecomposed fats, as tallow, &c. It should also be free from mucilaginous substances and hydrocarbons. When the stearic acid is fully melted, I then add to the same a water solution of carbonate of soda and aluminate of soda, obtained, preferably, in the following way: I first dissolve twenty-one and a half pounds of recrystallized sodium carbonate, in a suitable steam-jacketed caldron of about twenty gallons capacity, in ten gallons of water, and I add to the solution four hundred and fifty-two grams of caustic soda of the best grade of the commercial article. When all is dissolved, I add one hundred and seventy-five grams of metallic aluminium, preferably in the form of pieces about three inches by twelve inches square and twenty one-thousandths of an inch in thickness. When the metal is added to the solution, I turn off the heat and allow the metal to dissolve, which takes place inside of three hours. When all the metal is dissolved, the solution is filtered while still hot in a filter-press or in any other way. In adding the alkaline solution to the melted stearic acid I gradually raise the temperature of the latter so as to correspond with the increased melting-point of the mixture. The alkaline solution is added as rapidly as possible without unduly running the temperature down or causing excessive boiling or foaming. The solution can be added quite rapidly at first; but toward the end it must be added very slowly. The addition of the alkaline solution to the stearic acid results in the production of stearates and palmitates of soda and of aluminium, the latter being metallic soaps or metallic salts of fatty acids. During the saponification which thus takes place water is driven off. At the end of the operation the temperature will have gradually run up to about 360° Fahrenheit. I now add to the molten metallic-soap mixture twenty-one and thirty-six hundredths pounds of a very hard wax, preferably carnauba, the latter consisting of a mixture or combination of the higher fatty acids and alcohols. The carnauba-wax used should be as clean as possible, and it may be purified by melting the same with an equal weight of water, heating by a jet of direct steam and boiling for a short time, then drawing off or evaporating the water, after which it may be poured into pans, where it is allowed to cool into cakes suitable for weighing. When the carnauba-wax is added to the soap mixture, the temperature of the mass is raised to about 450° Fahrenheit and maintained until all foaming ceases, which usually takes about five hours. By thus subjecting the mixture to a relatively high heat a combination is effected between the alcohols of the carnauba-wax and the excessive stearic acid present in the metallic-soap composition, forming a hard wax-like compound ether, which gives to the composition many of its desirable characteristics. Unless the carnauba-wax is heated materially beyond its melting-point, resulting in the reaction referred to taking place, the composition, although harder, is very brittle and shrinks excessively and is therefore not so desirable as when the high heating is effected. Furthermore, unless this is done there is greater likelihood of decomposable products remaining in the composition, affecting the character thereof and resulting in the production of bubbles in the surface of the resulting duplicate.

After the treatment of the molten material at a high temperature has been effected and all foaming has ceased I add twenty-one and thirty-six hundredths pounds of ceresin thereto, although other hydrocarbon waxes may be employed, such as paraffin or ozocerite. The purpose of this latter ingredient is to make the mixture non-hygroscopic and also less brittle than it otherwise would be. When ceresin is used, its melting-point should be, preferably, about 145° Fahrenheit, and in any event as high as can be obtained, and it should present a fine grain on fracture and should be free from paraffin.

For the purpose of darkly coloring the composition a suitable amount of fine pure lampblack — say from .9 per cent. to three per cent. thereof — or other suitable inert finely-pulverized pigment may be added to the molten mass at any stage of the operation. Preferably, however, the coloring-matter is added together with the carnauba-wax.

After the ceresin is added and thoroughly incorporated with the mixture the congealing temperature of the latter may be regulated by adding free stearic acid thereto. In using the process described in the patent to Miller and Aylsworth, before referred to, I prefer to adjust the congealing-point of the mixture at about 290° Fahrenheit, since excellent commercial results have been secured at that temperature. I find that in dealing with temperatures above 290° Fahrenheit the addition of one per cent., by weight, of stearic acid effects a drop of about 5° Fahrenheit in the congealing-point. Obviously this regulation of the congealing-point of the mixture depends upon the special process which is to be followed in making duplicates, and where the congealing temperature is not important no attention whatever need be paid to its regulation. The material is now strained, preferably through open muslin, and is ready for use.

While I prefer in all cases to make use of caranuba-wax, as described, yet I find that beeswax and Chinese wax and palm-wax all contain alcohols somewhat similar to those of carnauba-wax and by which substantially similar reactions take place. These materials may therefore be substituted for the carnauba-wax, but always at a sacrifice in the desirable condition of the resulting products.

Having now described my invention, what I claim as new therein, and desire to secure by Letters Patent, is as follows:

1. A composition for phonograph recording-surfaces, comprising a metallic soap and a hard wax added thereto, substantially as set forth.

2. A composition for phonograph recording-surfaces, comprising a metallic soap and carnauba-wax added thereto, substantially as set forth.

3. A composition for phonograph recording-surfaces, comprising a mixture of metallic soap, a hard wax and a non-hygroscopic ingredient, substantially as set forth.

4. A composition for phonograph recording-surfaces, comprising a mixture of a metallic soap, a hard wax, and ceresin, substantially as set forth.

5. A composition for phonograph recording-surfaces, comprising a mixture of a metallic soap, carnauba-wax and a non-hygroscopic ingredient, substantially as set forth.

6. A composition for phonograph recording-surfaces, comprising a mixture of a metallic soap, carnauba-wax and ceresin, substantially as set forth.

7. A composition for phonograph recording-surfaces, comprising a mixture of a metallic soap and a wax-like compound ether, substantially as set forth.

8. A composition for phonograph recording-surfaces, comprising a mixture of a metallic soap, a wax-like compound ether, and a non-hygroscopic ingredient, substantially as set forth.

9. A composition for phonograph recording-surfaces, comprising a mixture of a metallic soap, a wax-like compound ether and ceresin, substantially as set forth.

10. A composition for phonograph recording-surfaces, comprising a mixture of a metallic soap, a hard wax and a black pigment, substantially as set forth.

11. A composition for phonograph recording-surfaces, comprising a mixture of a metallic soap, a hard wax and lampblack, substantially as set forth.

12. A composition for phonograph recording-surfaces, comprising a mixture of a metallic soap, carnauba-wax and a black pigment, substantially as set forth.

13. A composition for phonograph recording-surfaces, comprising a mixture of a metallic soap, carnauba-wax and lampblack, substantially as set forth.

14. A composition for phonograph recording-surfaces, comprising a mixture of a metallic soap, carnauba-wax, ceresin and a black pigment, substantially as set forth.

15. A composition for phonograph recording-surfaces, comprising a mixture of a metallic soap, carnauba-wax, ceresin and lampblack, substantially as set forth.

16. A composition for phonograph recording-surfaces, comprising a mixture of a metallic soap, a wax-like compound ether, and a black pigment, substantially as set forth.

17. A composition for phonograph recording-surfaces, comprising a mixture of a metallic soap, a wax-like compound ether and lampblack, substantially as set forth.

18. A composition for phonograph recording-surfaces, comprising a mixture of stearate of soda, carnauba-wax, and a non-hygroscopic ingredient, substantially as set forth.

19. A composition for phonograph recording-surfaces, comprising a mixture of stearate of soda, carnauba-wax and ceresin, substantially as set forth.

20. A composition for phonograph recording-surfaces, comprising a mixture of stearate of soda, carnauba-wax and a black pigment, substantially as set forth.

21. A composition for phonograph recording-surfaces, comprising a stearate of soda, carnauba-wax and lampblack, substantially as set forth.

22. A composition for phonograph recording-surfaces, comprising a mixture of stearate of soda, stearate of alumina, and carnauba-wax, substantially as set forth.

23. A composition for phonograph recording-surfaces, comprising a mixture of stearate of soda, stearate of alumina, carnauba-wax and lampblack, substantially as set forth.

24. A composition for phonograph recording-surfaces, comprising a mixture of stearate of soda, stearate of alumina, carnauba-wax, ceresin and lampblack, substantially as set forth.

This specification signed and witnessed this 29th day of October, 1903.

JONAS W. AYLSWORTH.

Witnesses:
 FRANK L. DYER,
 WILLIAM A. DOLAN.